3,324,180
PURIFICATION OF ACRYLAMIDE

Ludwig Beer, Friedrich Brunnmueller, and Horst Metzger, all of Ludwigshafen (Rhine), Germany, assignors to Badische Anilin- & Soda-Fabrik Aktiengesellschaft, Ludwigshafen (Rhine), Germany
No Drawing. Filed Nov. 10, 1964, Ser. No. 410,272
Claims priority, application Germany, Nov. 15, 1963, B 74,279
6 Claims. (Cl. 260—561)

This invention relates to a new process for the purification of acrylamide.

The most important process for the manufacture of solid acrylamide comprises partial hydrolysis of acrylonitrile with sulfuric acid with heating, e.g. to temperatures between 20 and 250° C., with the addition of metals, such as copper or iron, or salts thereof to prevent polymerization. The acrylamide sulfate first formed is neutralized with bases, such as calcium carbonate, calcium oxide, soda, caustic soda solution or ammonia with the addition of water, the salts, which are sparingly soluble in the reaction mixture in varying degrees, are filtered off and the acrylamide is isolated in solid form from the mother liquor by concentration and/or crystallization or spray drying.

The acrylamide obtained in this way does not have the high purity necessary for the production of acrylamide polymers or co-polymers. It contains varying amounts of inorganic salts some of which, although they do not appreciably affect polymerization, contaminate the polymer, while others, viz. the heavy-metal salts, which are added in the partial hydrolysis in small amounts to prevent polymerization, lower the K-value of polymers made from the acrylamide and discolor them in varying degrees. Moreover, in the partial hydrolysis of acrylonitrile there are formed by-products whose structure has not yet been identified and which, owing to their crosslinking effect, considerably impair the water-solubility of the polymers and, in some cases, also cause marked discoloration. Furthermore, these impure products polymerize fairly readily even in the solid condition and have therefore limited storability.

It is known that the inorganic salts formed in neutralization may be removed by extracting the acrylamide with a water-soluble alcohol or ketone and isolating the desired product by distilling off the solvent. This method however involves considerable expenditure for apparatus for distilling the solvent used in extraction and yields a crude acrylamide which must be purified by additional measures, such as recrystallization from ethylene chloride.

It is also known that acrylamide may be extracted from the neutralization mixture with a water-immiscible solvent and the excess water and the solvent distilled off azeotropically to isolate the product. This method also involves relatively high processing costs, and the quality of the product does not meet polymerization requirements.

It is further known that iron added for stabilization may be removed from acrylamide solutions by adding oxygen-containing phosphoric acids or salts thereof. Although this method lowers the iron content of the acrylamide, it fails to remove the by-products which are formed in partial hydrolysis and disturb polymerization. Polymers made from such products are discolored in varying degrees or are in a greater or lesser degree water-insoluble owing to partial crosslinking.

It is an object of this invention to provide a new, simpler process for purifying acrylamide. Another object is to provide a process for purifying acrylamide in which the inorganic salts and the by-products of unidentified structure formed in the preparation of acrylamide are removed at the same time. Yet another object of this invention is to provide a process for purifying acrylamide which after a single application yields acrylamide of such purity as could hitherto not be achieved by the use of a single purifying process or in a single purifying step. These and other objects and advantages will be evident from the following detailed description and examples.

We have found that solid acrylamide containing impurities can be satisfactorily purified by dissolving it in alcohols having one to five carbon atoms, separating the solution from the insoluble portion and isolating the acrylamide from this solution in solid form by cooling.

The product purified by the process according to this invention is colorless, practically free from metals such as iron, substantially free from neutral salts and eminently suitable for the production of both homopolymers and copolymers. It was not to be expected that the disturbing metal impurities would be removed to such an outstanding degree, since it is stated in U.S. patent specification 2,840,611 that conventional recrystallization is insufficient to remove iron. The process may be applied to acrylamide prepared in conventional manner; it is of particular importance for the purification of acrylamide which in preparation has been separated from an aqueous solution.

It is common knowledge that solids can be purified by recrystallization from solvents. Surprisingly, however, the solvents that have hitherto been recommended for the purification of acrylamide, e.g. chlorinated or aromatic hydrocarbons, are much less effective than alcohols as regards the removal of substances which adversely affect polymerization. It is also surprising that alcohols should be at all suitable for recrystallization, since it is known that acrylamide is fairly readily soluble in alcohol and solvents having high solvent power are in general regarded as little suitable for recrystallizations. Both straight-chain and branched saturated aliphatic alcohols having one to five carbon atoms and one hydroxyl group, e.g. methanol, ethanol, n-propanol, i-propanol, n-butanol, i-butanol and tert-butanol, are suitable. Good purification effects are also achieved with diols or triols, such as ethylene glycol, propanediol-1,3, butanediol-1,4, or glycerin. It is preferred to use alkanols with one to three carbon atoms.

The process is particularly suitable for purifying acrylamide such as is obtained in solid form by industrial processes, e.g. partial hydrolysis of acrylonitrile and concentration, recrystallization or spray drying. The crude acrylamide may contain major amounts, e.g. 1 to 20%, of neutral salts, such as ammonium sulfate, sodium sulfate or calcium sulfate, as well as heavy-metal impurities in such amounts as are usually added to it to prevent polymerization, e.g. 100 p.p.m., without the purifying effect being impaired. Nor has any water adhering to the crude acrylamide after filtration or centrifuging any disturbing influence.

Purifying operations are usually carried out by methods conventionally used in recrystallization. The acrylamide to be purified is dissolved in the alcohol in question by heating (if necessary with the addition of a small amount, e.g. from 0.01 to 0.1% by weight, of a suitable polymerization inhibitor, e.g. sodium nitrite or the sodium salt of ethylenediamine-N,N,N',N'-tetraacetic acid), the solution is separated from the insoluble portion by filtration or centrifuging and the pure acrylamide is crystallized out by lowering the temperature. The acrylamide is separated from the mother liquor by filtration or centrifuging and dried under mild conditions, e.g. at subatmospheric pressure. It depends mainly on the type of alcohol employed what temperature range is used for recrystallization of the acrylamide; it may easily be determined by preliminary experiments.

In general it is not expedient to exceed temperatures of about 100° C. in dissolving the acrylamide since higher temperatures may lead to appreciable polymerization. The lower permissible temperature chiefly depends upon the freezing point of the alcohol used or its eutectic mixture with acrylamide, but it is also governed by economic considerations.

A special advantage of the process according to this invention arises from the fact that acrylamide has a considerable solubility temperature coefficient, particularly at temperatures between 20 and 80° C., so that the amount of solvent required is very small in relation to the amount of purified acrylamide. Moreover the mother liquors may be used repeatedly without the purifying effect being impaired.

The process according to this invention may be carried out batchwise or continuously.

To assess the purity of the acrylamide two tests are carried out:

TEST 1

20 parts of acrylamide is dissolved in 80 parts of distilled water, the solution brought to pH 7 and polymerization initiated by adding 0.1 part of potassium persulfate and 0.05 part of formaldehyde sodium sulfoxylate. The polymerization mixture is allowed to stand without external cooling. The water solubility of the polymer and the K-value of a 1% aqueous solution with reference to acrylamide are determined.

TEST 2

45 parts of acrylamide, 135 parts of styrene, 105 parts of ethyl acrylate and 15 parts of acrylic acid are heated in 300 parts of butanol. 4.5 parts of cumene hydroperoxide (70%) is added at 60° C. The reaction mixture is refluxed at a temperature of 105 to 107° C. for three hours. Then 180 parts of a 40% butanolic formaldehyde solution and 1.5 parts of cumene hydroperoxide are added. During the course of 2 to 2½ hours 18 cm.³ of water are removed by entrainment while heating is continued.

Before determining the viscosity the content of copolymer in the solution is determined by adding 2 g. of butanol to 2 g. of the solution and keeping the solution obtained at 125° C. for two hours. For determining the viscosity only such samples are used which contain 40 to 43% by weight of copolymer with reference to the original solution. The resin solution is adjusted with butanol to a polymer content of 30% and the viscosity is determined according to the method published in Deutsche Normen DIN 53211 (June 1962) at 20° C. in a DIN beaker No. 6.

If the samples are to be suitable the solutions must not contain any slimy substances or jelly particles and must be capable of being filtered in a nutsch in a few minutes.

Example 1

Crude acrylamide (prepared by partial hydrolysis of acrylonitrile stabilized with iron by means of aqueous sulfuric acid, adjusting the pH to 5 to 6 with ammonia, filtering off the insoluble salts formed in neutralization, and isolating the product from the mother liquor in solid form by concentration and crystallization) is recrystallized from various solvents. The products obtained are dried under subatmospheric pressure and then tested for their polymerization properties.

|  | Without recrystallization | Recrystallization from— | | | | | | |
|---|---|---|---|---|---|---|---|---|
|  |  | Water | Chloroform | Benzene | Methanol | i-Propanol | Ethanol | i-Butanol |
| Acrylamide content (percent) | 85–95 | 95–97 | 96–98 | 95–97 | >99 | >99 | >99 | 99. |
| Ammonium sulfate content (percent) | 3–10 | 1–2 | <0.2 | <0.2 | <0.2 | <0.2 | <0.2 | <0.2. |
| Iron content (p.p.m.) | 10–40 | 10–15 | 5–10 | 5–10 | <1 | <1 | <1 | 2. |
| Test 1: |  |  |  |  |  |  |  |  |
| Water-solubility | −¹ | +² | + | + | + | + | + | +. |
| K-value |  | 127 | 124 | 126 | 165 | 152 | 154 | 146. |
| Test 2: |  |  |  |  |  |  |  |  |
| Appearance | Red brown, very turbid.³ | Orange yellow, turbid. | Yellow, turbid. | Yellow, turbid. | Almost colorless, clear. | Almost colorless, clear. | Almost colorless, clear. | Yellowish, slightly turbid. |
| Viscosity ("/6) | 150–200 | 100–150 | 80–100 | 80–100 | 50–60 | 50–60 | 50–60 | 50–60. |
| Filterability | None | None | Poor | Poor | Good | Good | Good | Good. |

¹ —means the presence of crosslinked water-insoluble substances.
² +means complete water-solubility.
³ For the sake of comparison the polymer was filtered.

Example 2

500 parts of crude acrylamide prepared as indicated in Example 1 is dissolved, at 55 to 60° C., in 600 parts of mother liquor such as occurs in the recrystallization of acrylamide from methanol, the insoluble portion is filtered off and the solution cooled to 0 to −5° C. The acrylamide is separated by centrifuging and dried; it has an acrylamide content of 99%, a salt content of <0.2% and an iron content of <1 p.p.m. and is obtained in a practically quantitative yield.

Example 3

400 parts of acrylamide containing 24 p.p.m. of copper is dissolved in 250 parts of methanol at 60° C., the solution is filtered off from the insoluble portion and the filtrate cooled to −10° C., 300 parts of acrylamide crystallizing out which is filtered off and dried under subatmospheric pressure. According to Test 1, the K-value of the acrylamide has been improved from 120 to 155. The polymer obtained according to Test 2 is much lighter in color and less turbid than material which has not been pretreated but has been filtered after polymerization.

We claim:
1. A process for the purification of contaminated solid acrylamide which comprises dissolving said acrylamide in a lower alkanol having one to five carbon atoms, separating the solution from the insoluble portion, and isolating solid acrylamide from the solution by lowering the temperature.
2. A process as claimed in claim 1 wherein methanol is used as the lower alcohol.
3. A process as claimed in claim 1 wherein i-propanol is used as the lower alcohol.
4. A process as claimed in claim 1 wherein i-butanol is used as the lower alcohol.
5. A process as claimed in claim 1 carried out at a temperature below 100° C.
6. A process as claimed in claim 1 carried out in the presence of polymerization inhibitors.

References Cited

UNITED STATES PATENTS

| 2,535,245 | 12/1950 | Weisgerber | 260—561 |
| 2,587,209 | 2/1952 | Phillips | 260—561 |
| 2,753,375 | 7/1956 | Webb et al. | 260—561 |

(Other references on following page)

FOREIGN PATENTS 631,592 9/1946 Great Britain.
897,209 5/1962 Great Britain.

OTHER REFERENCES

Gattermann et al.: Die Praxis des Organischen Chemikers, 34th ed., pages 4–6 (1952).

Weygand: Organisch-Chemische Experimentierkunst, 2nd ed., pages 86–90 (1948).

WALTER. A. MODANCE, *Primary Examiner.*

N. TROUSOF, *Assistant Examiner.*